US011605992B2

(12) United States Patent
Nakamasu et al.

(10) Patent No.: US 11,605,992 B2
(45) Date of Patent: Mar. 14, 2023

(54) MOTOR, MOTOR ASSEMBLY, AND AIR CONDITIONER (71) Applicant: DAIKIN INDUSTRIES, LTD., Osaka (JP)

(72) Inventors: Shin Nakamasu, Osaka (JP); Hirokazu Fujii, Osaka (JP); Ryousuke Kishi, Osaka (JP); Yoshiki Kawai, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/741,061

(22) Filed: May 10, 2022

(65) Prior Publication Data

US 2022/0271590 A1 Aug. 25, 2022

Related U.S. Application Data (63) Continuation of application No. PCT/JP2020/043878, filed on Nov. 25, 2020.

(30) Foreign Application Priority Data

Nov. 29, 2019 (JP) .............................. JP2019-217435

(51) Int. Cl.
*H02K 1/28* (2006.01)
*F24F 1/0018* (2019.01)
(Continued)

(52) U.S. Cl.
CPC ............. *H02K 1/28* (2013.01); *F24F 1/0018* (2013.01); *H02K 1/18* (2013.01); *H02K 7/14* (2013.01)

(58) Field of Classification Search
CPC .... H02K 1/28; H02K 1/18; H02K 7/14; F24F 1/0018
(Continued)

(56) References Cited

U.S. PATENT DOCUMENTS 7,122,923 B2 * 10/2006 Lafontaine ............. H02K 1/187
310/58
7,352,102 B2 * 4/2008 Kawasaki ............. H02K 1/185
310/216.057
(Continued)

FOREIGN PATENT DOCUMENTS

CN 101931277 A 12/2010
CN 105191075 A 12/2015
(Continued)

OTHER PUBLICATIONS

International Search Report of corresponding PCT Application No. PCT/JP2020/043878 dated Feb. 9, 2021.
(Continued)

*Primary Examiner* — John K Kim
(74) *Attorney, Agent, or Firm* — Global IP Counselors, LLP (57) ABSTRACT A motor assembly includes a motor and sealing member fixed to a frame. The motor includes a stator and a rotor. The stator includes a coil holding portion and a first portion with an annular shape and extending radially outward from the coil holding portion. The rotor includes a magnet and a magnet holding portion located in a first space. The first portion has a first surface in contact with the first space, and a second surface on a side opposite to the first surface. A through hole penetrates from the first surface to the second surface in the first portion. The sealing member is disposed on a side of the stator opposite to the rotor, and is fixed to the frame so a second space between the sealing member and the stator does not communicate with an external space other than the first space.

11 Claims, 12 Drawing Sheets (51) Int. Cl.
*H02K 1/18* (2006.01)
*H02K 7/14* (2006.01)

(58) Field of Classification Search
USPC .......................................................... 310/179
See application file for complete search history.

(56) References Cited

U.S. PATENT DOCUMENTS

| | | | | |
|---|---|---|---|---|
| 8,198,764 B2* | 6/2012 | Booth | ...................... | H02K 9/08 |
| | | | | 310/58 |
| 9,739,312 B2* | 8/2017 | Uchibori | .............. | H02K 5/1677 |
| 9,800,117 B2* | 10/2017 | Iwai | .................. | H02K 9/06 |
| 9,979,267 B2* | 5/2018 | Kusase | ................... | H02K 1/27 |
| 11,031,831 B2* | 6/2021 | Oikawa | ................. | H02K 1/185 |
| 2005/0035673 A1* | 2/2005 | Lafontaine | .............. | H02K 9/19 |
| | | | | 310/58 |
| 2007/0247010 A1* | 10/2007 | Ichizaki | ................ | H02K 11/33 |
| | | | | 310/67 R |
| 2013/0264895 A1 | 10/2013 | Kondou et al. | | |
| 2014/0132122 A1* | 5/2014 | Furukawa | ................ | H02K 5/15 |
| | | | | 310/68 B |
| 2015/0240866 A1* | 8/2015 | Sakuragi | .............. | G02B 26/121 |
| | | | | 310/90 |
| 2016/0065007 A1* | 3/2016 | Sumi | ........................ | H02K 1/08 |
| | | | | 310/216.057 |
| 2018/0226857 A1* | 8/2018 | Ishizaki | ................ | F04D 25/062 |
| 2020/0227981 A1* | 7/2020 | Oketani | ................. | F24F 1/0018 |
| 2022/0271590 A1* | 8/2022 | Nakamasu | ............. | H02K 7/085 |

FOREIGN PATENT DOCUMENTS

| | | |
|---|---|---|
| JP | 2005-69574 A | 3/2005 |
| JP | 2013-219950 A | 10/2013 |
| JP | 2015-162936 A | 9/2015 |
| JP | 2019-103281 A | 6/2019 |

OTHER PUBLICATIONS

International Preliminary Report of corresponding PCT Application No. PCT/JP2020/043878 dated Jun. 9, 2022.
European Search Report of corresponding EP Application No. 20 89 3811.8 dated Dec. 14, 2022.

* cited by examiner

MOTOR, MOTOR ASSEMBLY, AND AIR CONDITIONER

CROSS-REFERENCE TO RELATED APPLICATIONS

This is a continuation of International Application No. PCT/JP2020/043878 filed on Nov. 25, 2020, which claims priority to Japanese Patent Application No. 2019-217435, filed on Nov. 29, 2019. The entire disclosures of these applications are incorporated by reference herein.

BACKGROUND

Technical Field

The present invention relates to a motor, a motor assembly, and an air conditioner.

Background Art

As disclosed in JP 2019-103281 A, there is a conventional motor including a stator that has a coil and a rotor that rotates on an outer peripheral side of the stator.

SUMMARY

A motor assembly according to a first aspect includes a motor, a sealing member, and a frame. The motor and the sealing member are fixed to the frame. The motor includes a stator and a rotor. The stator includes a coil holding portion and a first portion, the coil holding portion holding a coil, the first portion having an annular shape and extending radially outward from the coil holding portion. The rotor includes a magnet and a magnet holding portion that holds the magnet. The magnet holding portion is located in a first space having an annular shape and located radially outside the coil holding portion. The first portion has a first surface having an annular shape and being in contact with the first space, and a second surface having an annular shape and being on a side opposite to the first surface. A through hole that penetrates from the first surface to the second surface is formed in the first portion. The sealing member is disposed on a side of the stator opposite to the rotor in a rotation axis direction, and fixed to the frame in such a way that a second space between the sealing member and the stator does not communicate with an external space other than the first space.

DETAILED DESCRIPTION OF EMBODIMENT(S)

(1) Overall Configuration of Air Conditioning Indoor Unit

Figure 1:
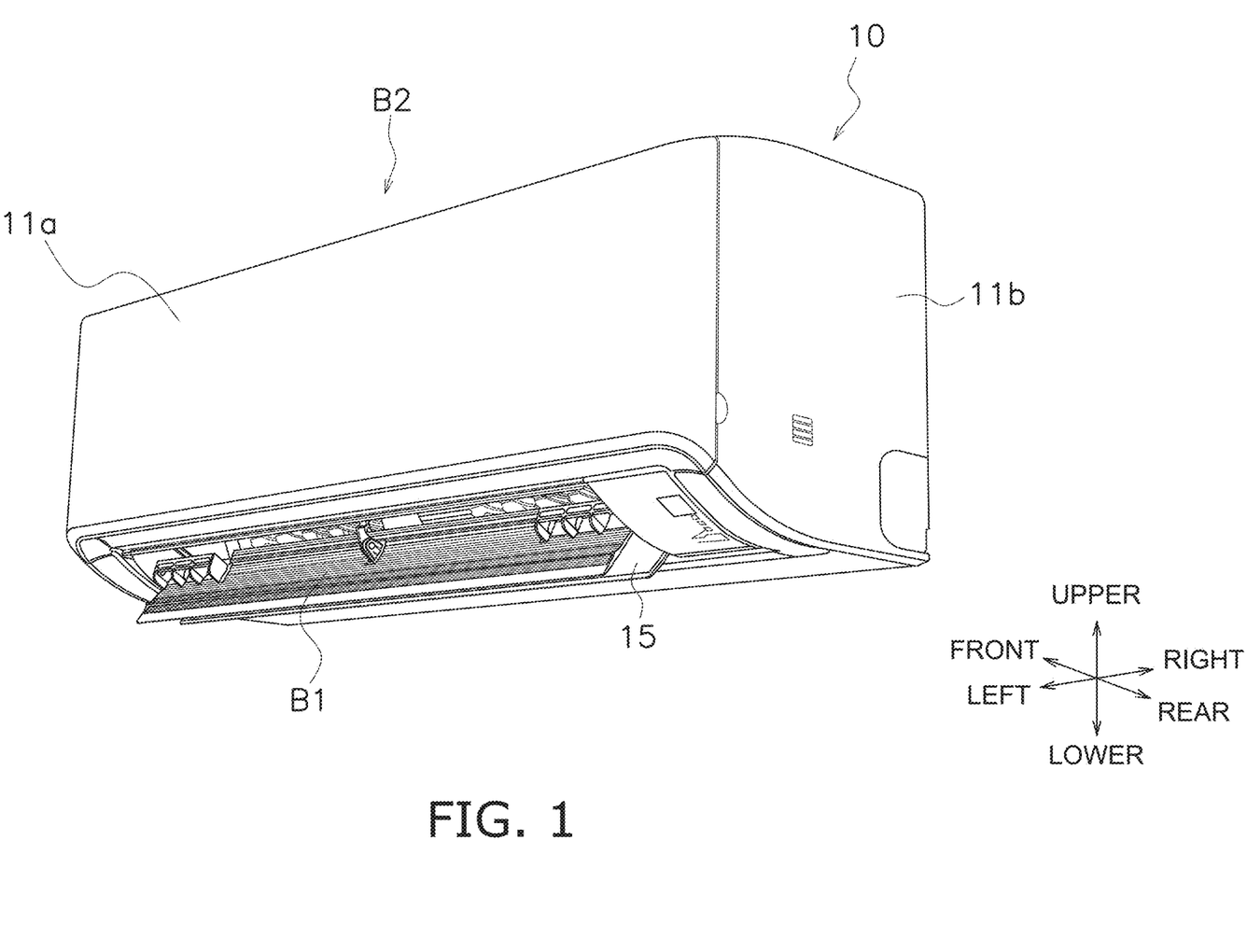
FIG. 1 is an external view of an air conditioning indoor unit.
Figure 2:
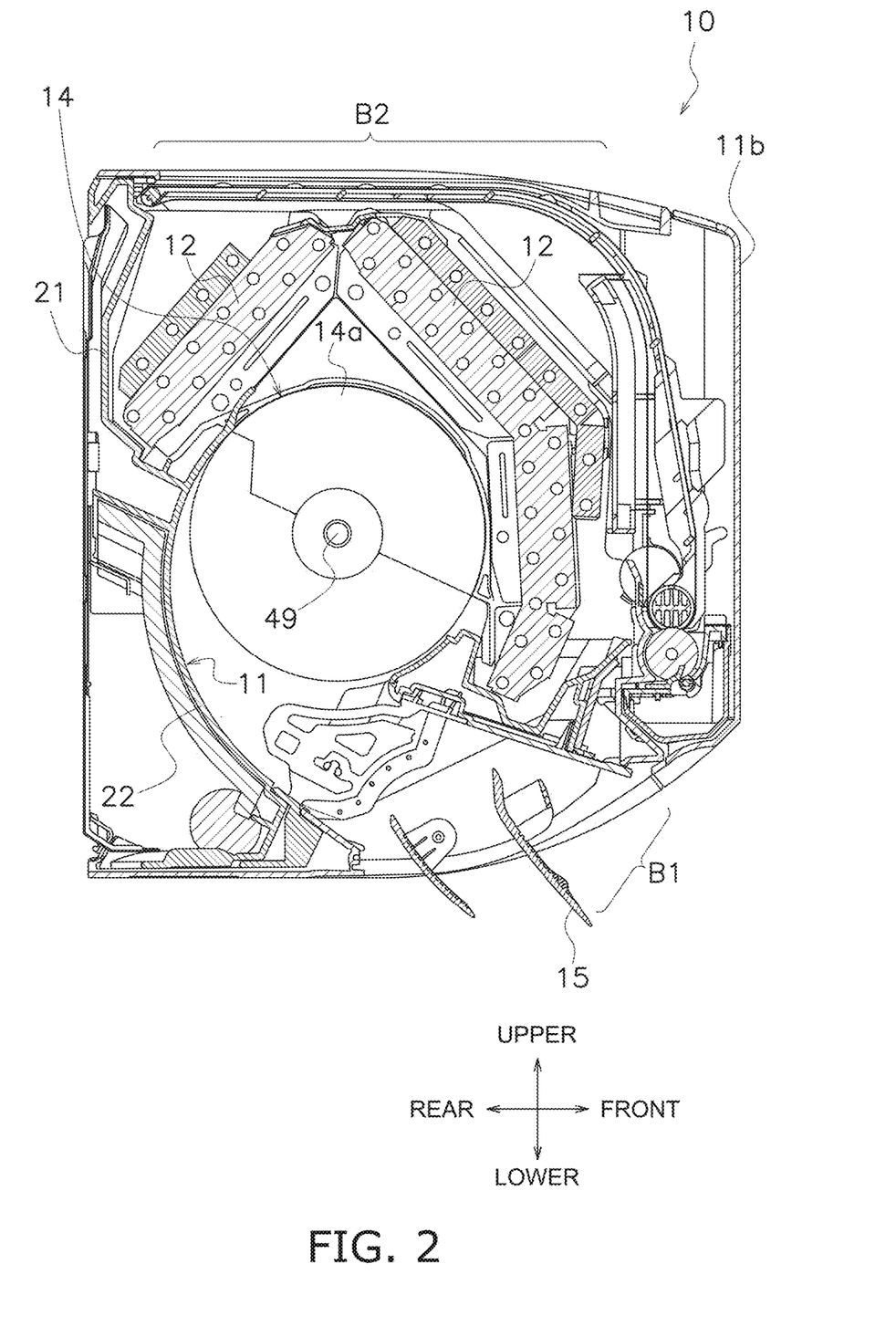
FIG. 2 is a longitudinal cross-sectional view of the air conditioning indoor unit.

An air conditioning indoor unit 10 constitutes a vapor compression refrigerant cycle together with an air conditioning outdoor unit (not illustrated), and is an air conditioner that performs an air conditioning operation such as cooling, heating, and dehumidification in a room. FIG. 1 illustrates an external appearance of the air conditioning indoor unit 10, and FIG. 2 illustrates a longitudinal cross-sectional view of the air conditioning indoor unit 10.

The air conditioning indoor unit 10 is a wall-mounted unit that is used with a rear surface against an indoor wall. In FIG. 1 and the like, front, rear, upper, lower, right, and left arrows indicate directions when the air conditioning indoor unit 10 is mounted on a wall and the air conditioning indoor unit 10 is viewed from a front side toward the wall.

The air conditioning indoor unit 10 includes a frame 11, a front panel 11a, a main body cover 11b, a heat exchanger 12, a cross-flow fan 14, a flap 15, and the like. The heat exchanger 12 and the cross-flow fan 14 are supported by the frame 11, and covered by the front panel 11a and the main body cover 11b.

On an upper surface of the main body cover 11b, a suction port B2 is formed, and a lower surface of the main body cover 11b is formed with a blow-out port B1. The flap 15 is disposed at the blow-out port B1.

A refrigerant flows inside a heat transfer tube of the heat exchanger 12, and the refrigerant exchanges heat with air flowing around the heat exchanger. The air is suctioned from the suction port B2 as the cross-flow fan 14 rotates. The air having flowed from the suction port B2 to the heat exchanger 12 passes through the cross-flow fan 14, and is blown out from the blow-out port B1 into an indoor space. A direction of the blown-out air can be changed by a position of the flap 15.

Figure 3:
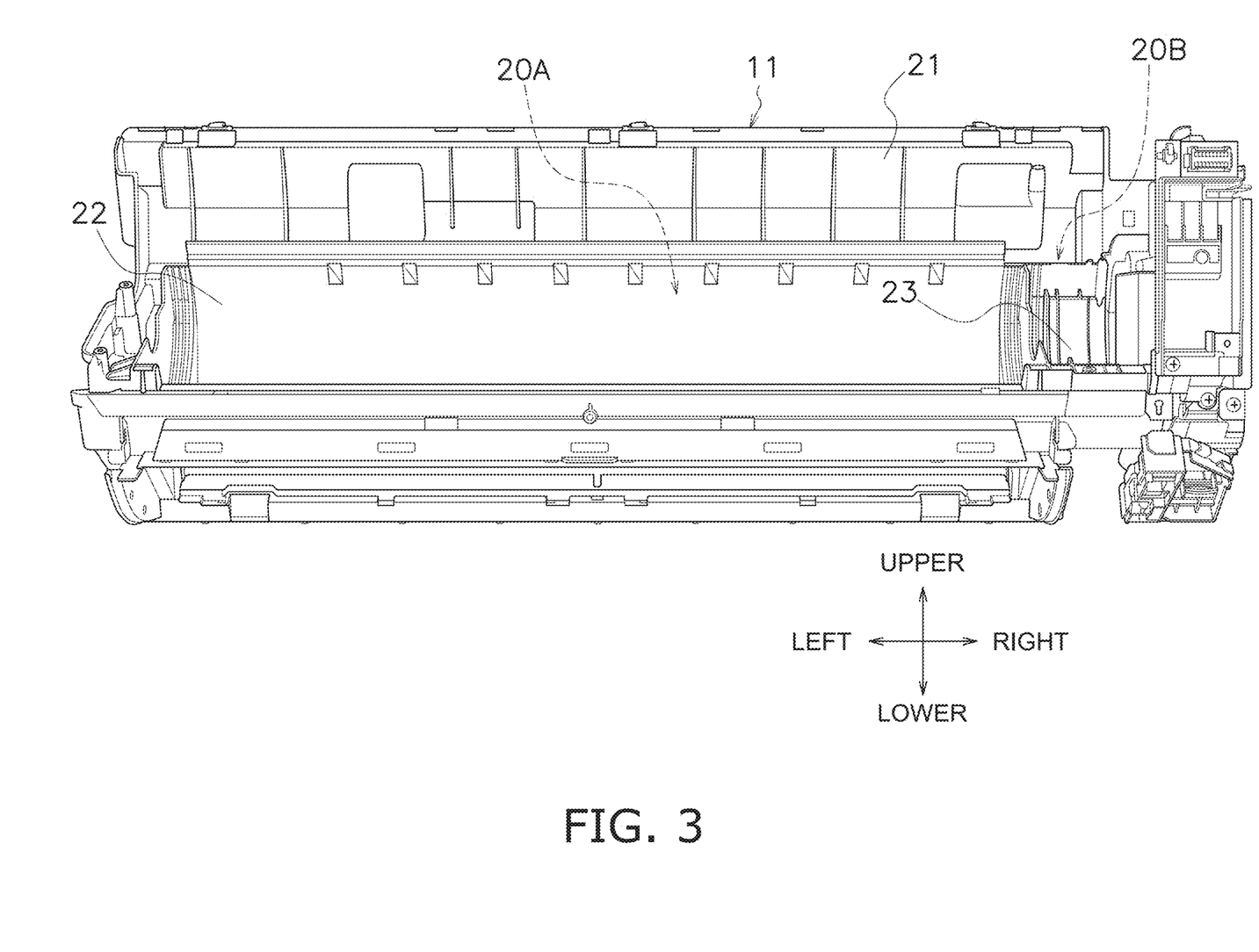
FIG. 3 is a front view of a frame and the like of the air conditioning indoor unit.

The cross-flow fan 14 is a fan having a cylindrical fan rotor 14a extending long in left and right. On the right side of the cross-flow fan 14, a motor 40 that rotates the fan rotor 14a is disposed. The cross-flow fan 14 is disposed in a fan accommodating space 20A of the frame 11 illustrated in FIG. 3. The motor 40 is disposed in a motor accommodating space 20B of the frame 11 illustrated in FIG. 3. The frame 11 is a resin member including a rear surface portion 21 that also serves as a drain pan, a scroll portion 22 located below the cross-flow fan 14, a first motor supporting portion 23 that supports the motor 40, and the like.

(2) Outline of Motor and Motor Assembly

Figure 4:
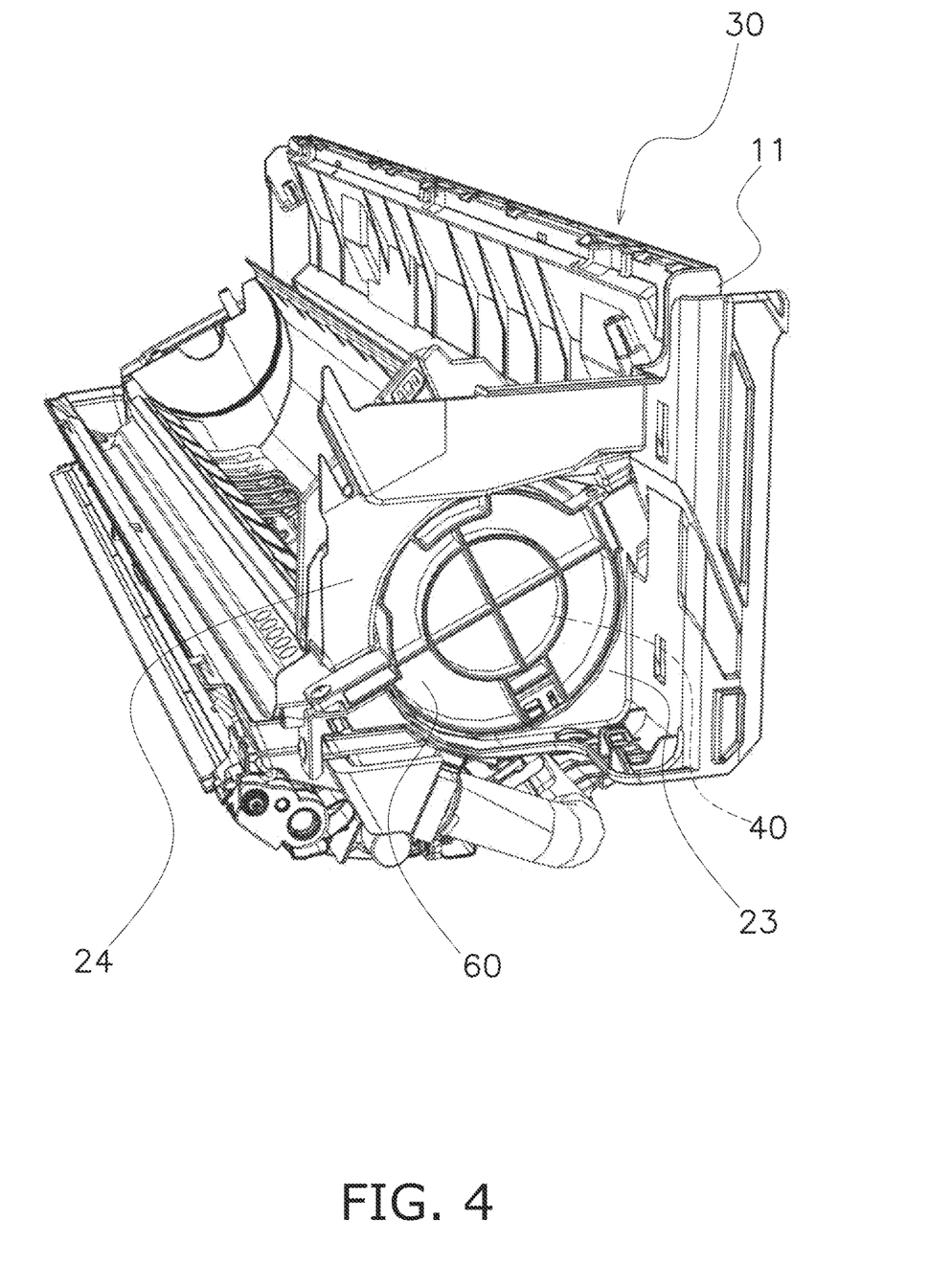
FIG. 4 is a view of a motor assembly including a frame, a motor, and a sealing member as viewed obliquely from upper right.

FIG. 4 illustrates a motor assembly 30 in which the motor 40 and a sealing member 60 (described later) are fixed to the frame 11. FIG. 4 is a view of the motor assembly 30 as viewed from diagonally upper right. The motor 40 that rotates the fan rotor 14a of the cross-flow fan 14 is fixed to the frame 11 in a state where a seal member 50 to be described later is wound.

Figure 5:
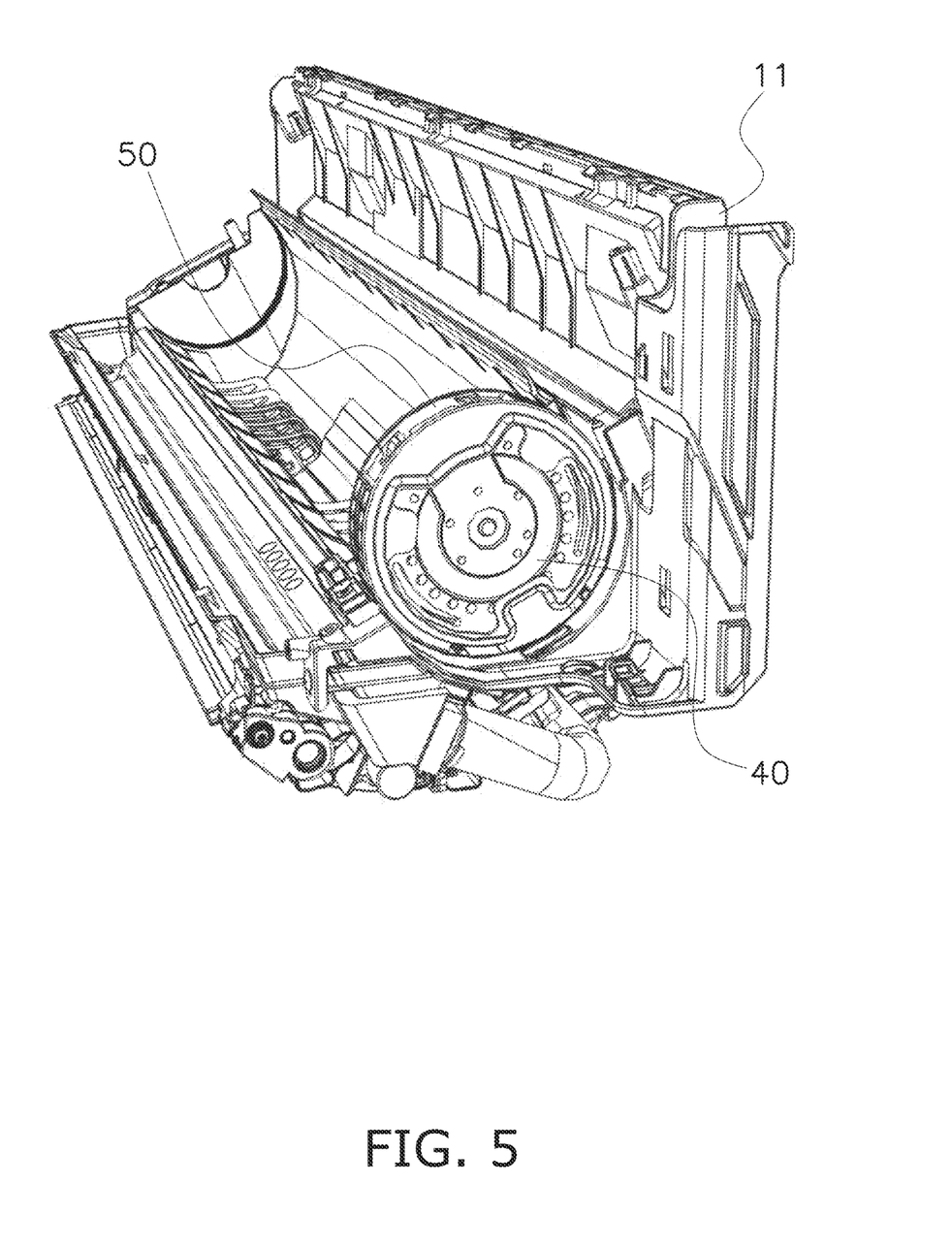
FIG. 5 is a perspective view illustrating a state in which the sealing member is removed from the motor assembly of FIG. 4.

FIG. 5 illustrates a state in which the sealing member 60 is removed from the motor assembly 30 of FIG. 4. In FIG. 5, the motor 40 is exposed. In the state illustrated in FIG. 5, the motor 40 is placed on the frame 11 via the seal member 50 to be described later. The motor 40 is fixed to the frame 11 by covering the motor 40 illustrated in FIG. 5 with a second motor support member 24 from above, and further mounting the sealing member 60 from the right side.

Note that, in FIGS. 4 and 5, illustration of other components such as the cross-flow fan 14 is omitted for easy understanding.

Figure 6:
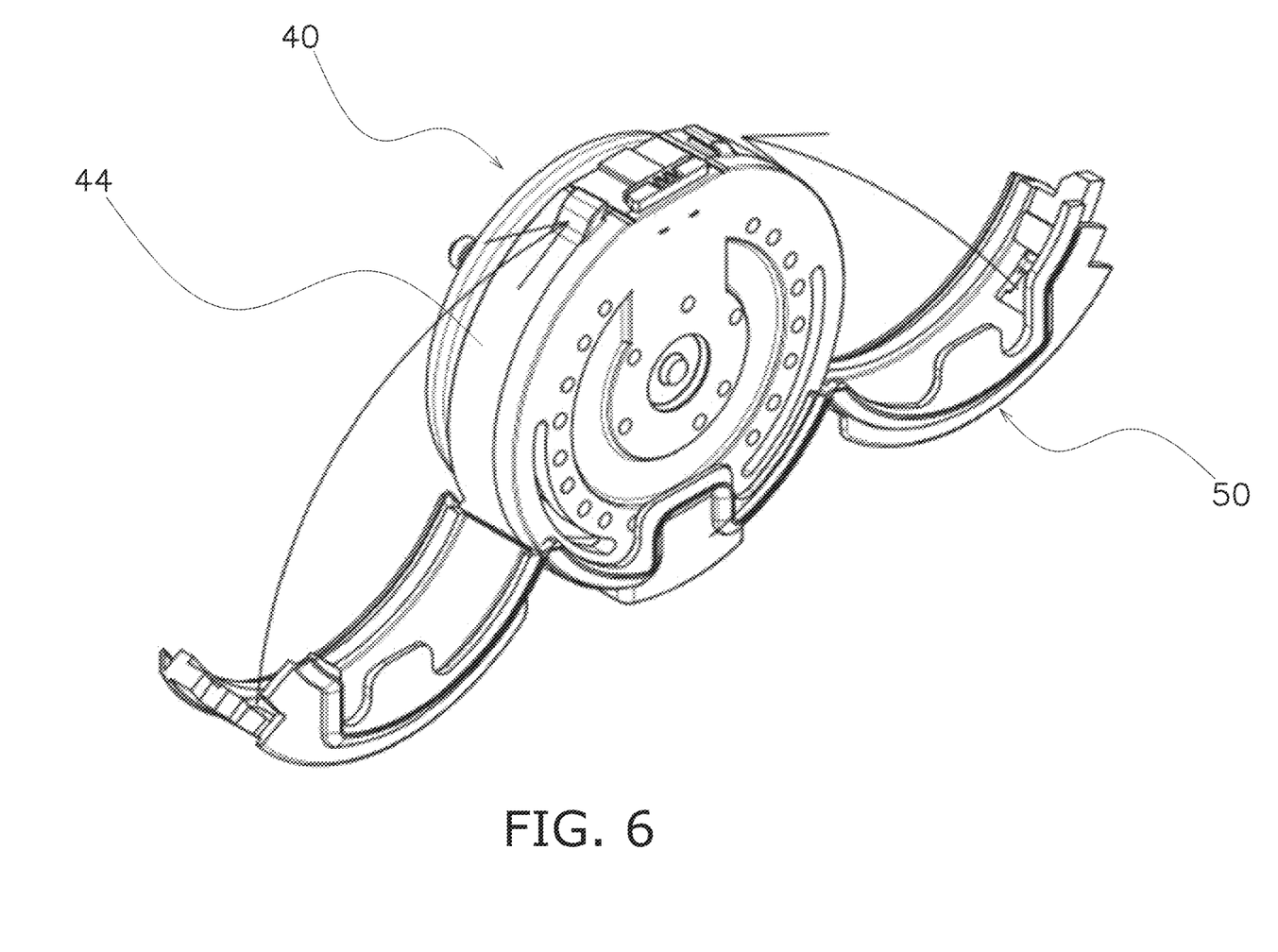
FIG. 6 is a perspective view illustrating how to wind a seal member around the motor.
Figure 7:
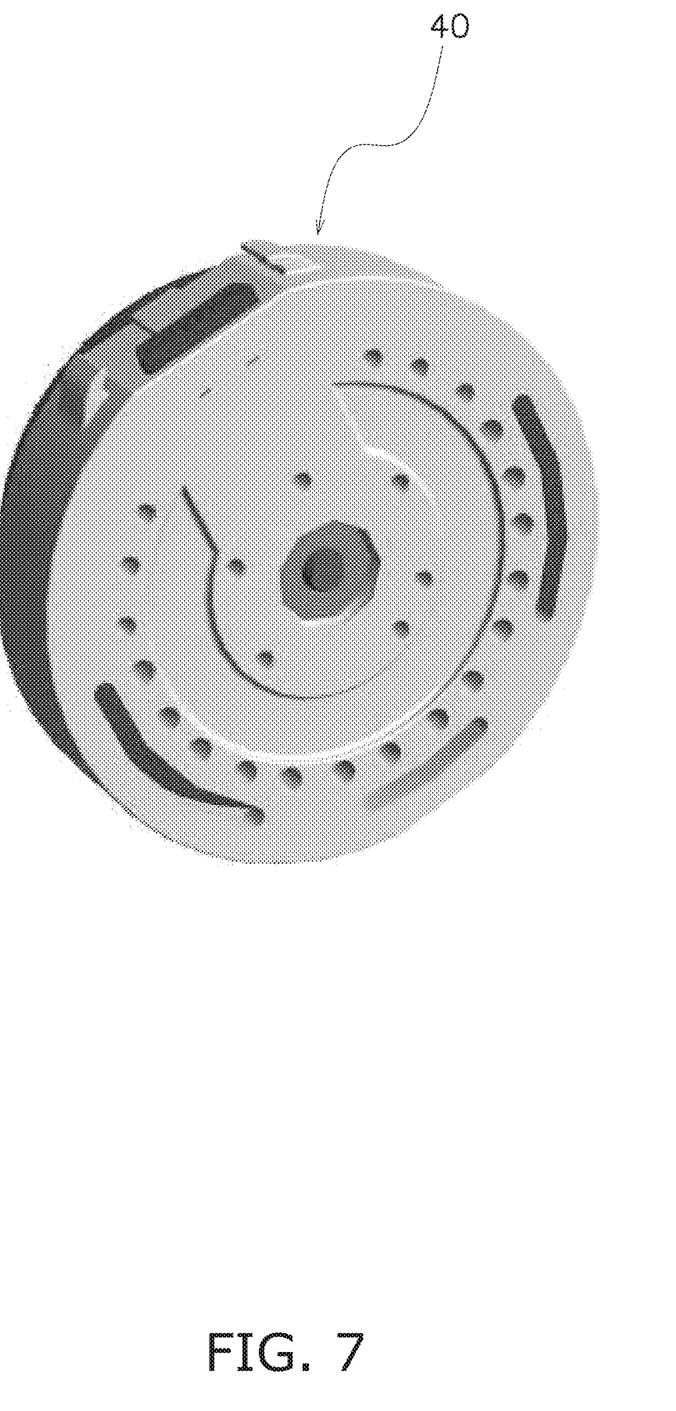
FIG. 7 is a view of the motor as viewed obliquely from upper right.
Figure 8:
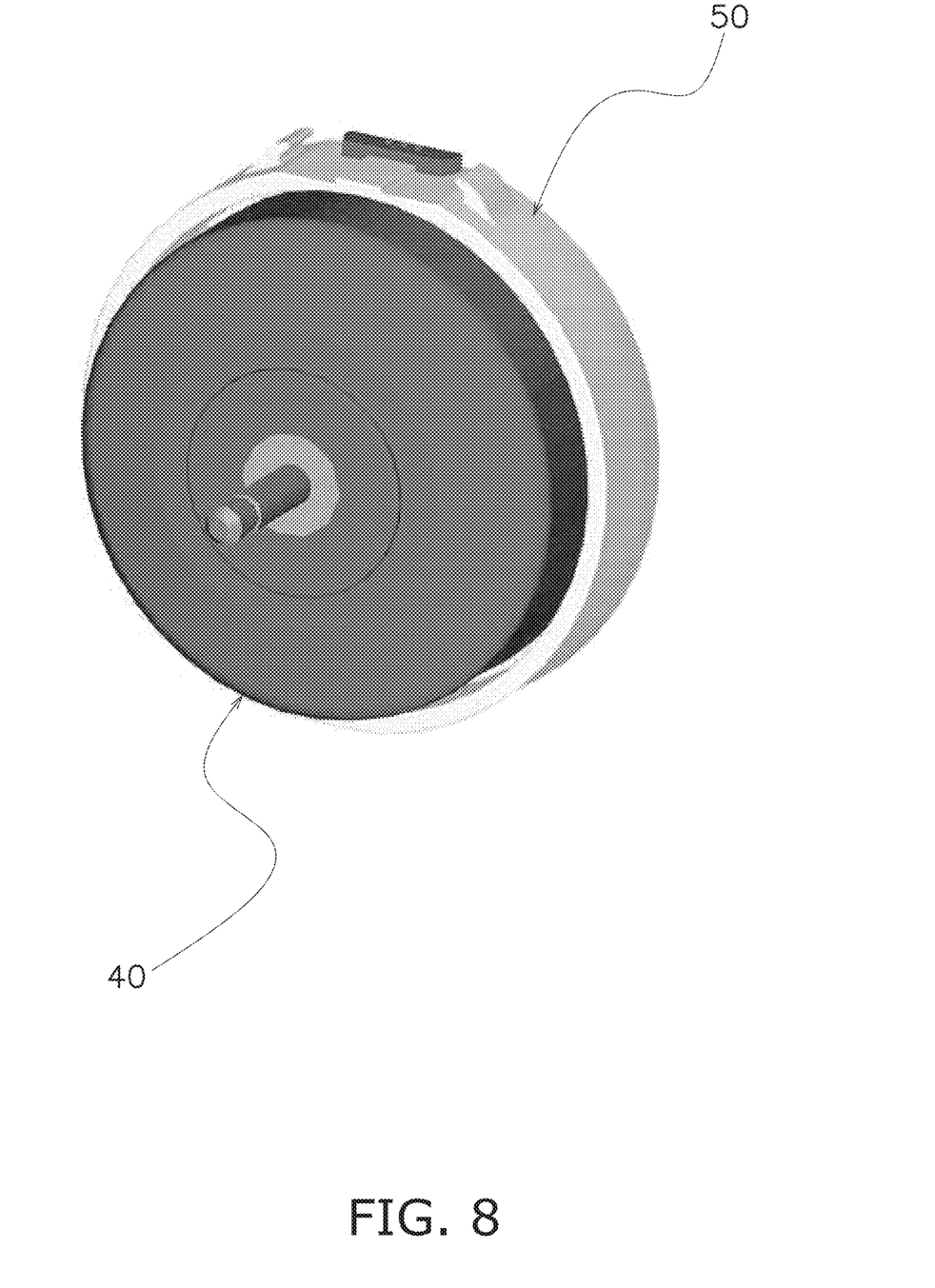
FIG. 8 is a view of the motor around which the seal member is wound, as viewed obliquely from upper left.

FIG. 6 is a view illustrating how to wind the seal member 50 around the motor 40. The seal member 50 is a rubber member, and is wound around an outer peripheral portion 44 of the motor 40 from radially outside as indicated by an arrow in FIG. 6. The seal member 50 is a member that plays a role as a vibration-proof rubber that prevents vibrations of the motor 40 from being transmitted to the frame 11, and also plays a role to prevent air from moving between left and right spaces S2 and S3 (see FIG. 12) of the motor 40. The latter role of partitioning the left and right spaces S2 and S3 of the motor 40 is achieved by the frame 11 and the sealing member 60, in addition to the seal member 50.

(3) Detailed Configuration of Motor and Motor Assembly

Next, a structure of the motor 40 and a structure of the motor assembly 30 in which the motor 40 and the sealing member 60 are fixed to the frame 11 will be described in detail.

(3-1) Motor

The motor 40 will be described with reference to FIGS. 12 and 9 to 11. The motor 40 mainly includes a stator 41 and a rotor 46.

Figure 12:
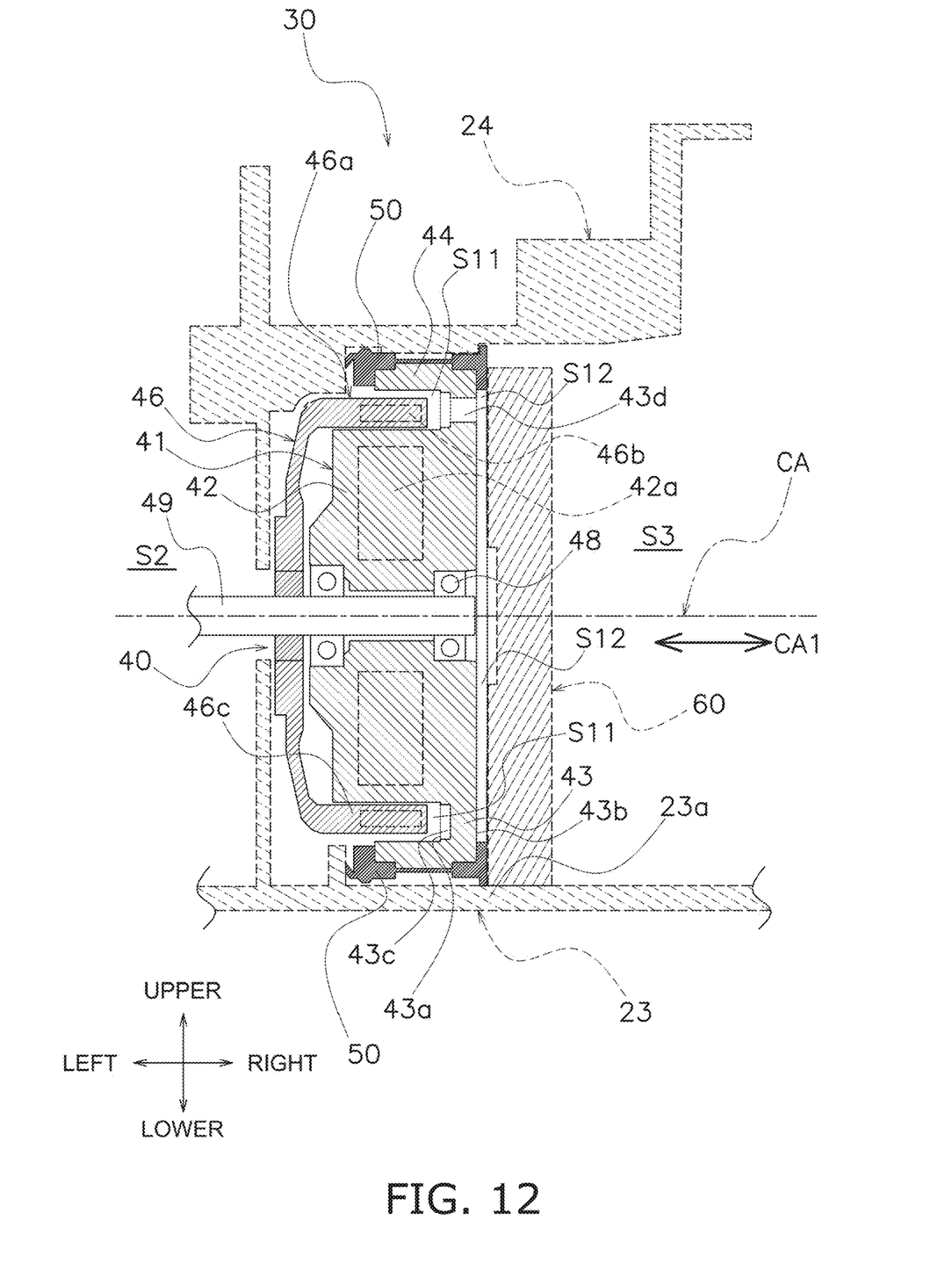
FIG. 12 is a longitudinal cross-sectional view of the motor assembly including the motor.

The stator 41 includes a coil 42a, a coil holding portion 42 that holds the coil 42a, a doughnut-shaped first portion 43, and the cylindrical outer peripheral portion 44. The first portion 43 extends radially outward from a right end part of the coil holding portion 42. The outer peripheral portion 44 extends leftward from an outer peripheral end part of the first portion 43. The coil holding portion 42, the first portion 43, and the outer peripheral portion 44 are portions of a resin member integrally molded.

Figure 11:
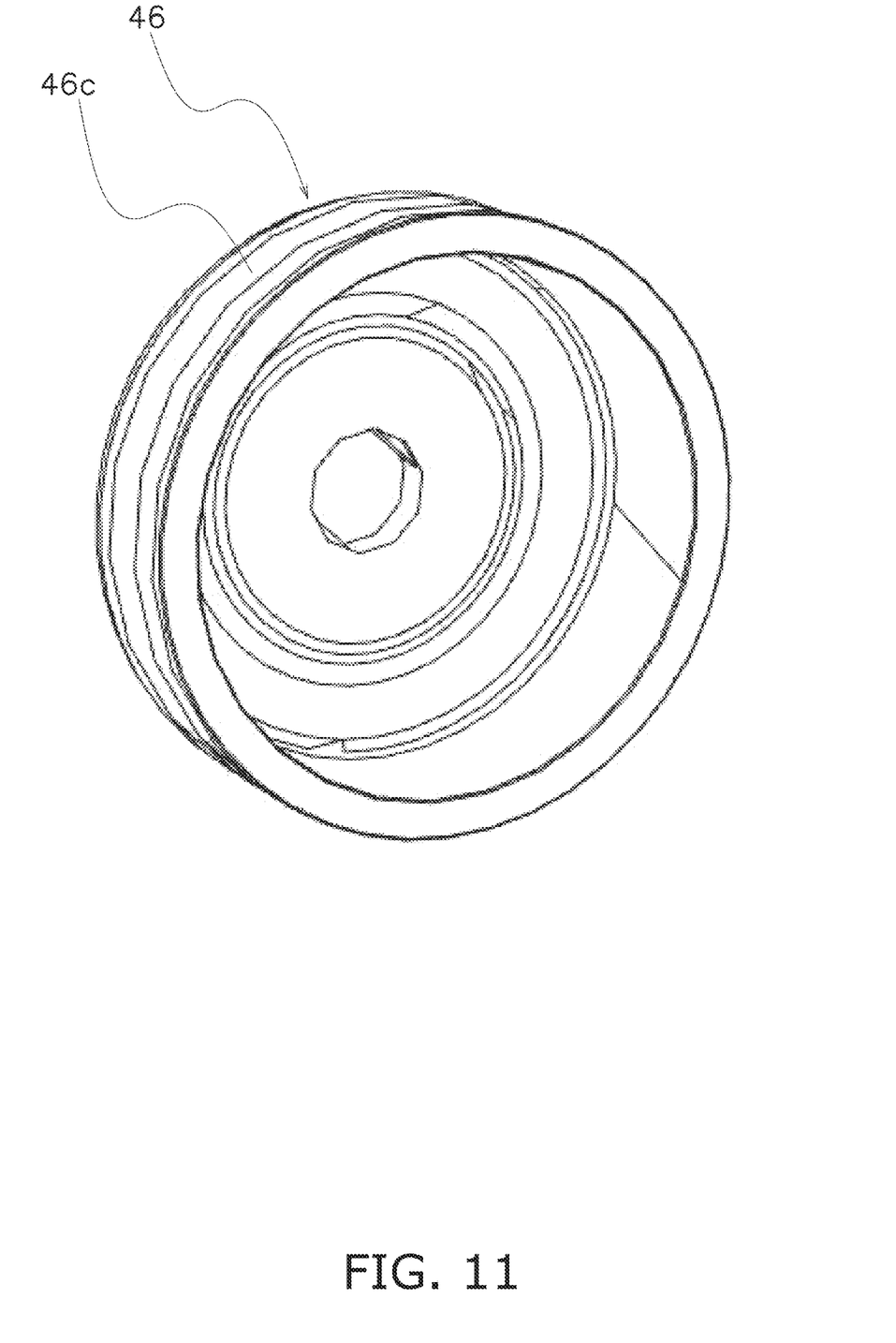
FIG. 11 is a view of a rotor of the motor as viewed obliquely from upper right.

The rotor 46 includes a magnet 46b and a magnet holding portion 46a that holds the magnet 46b. The magnet holding portion 46a is a cylindrical outer peripheral portion of the rotor 46, and is located in an annular first space S11. The first space S11 is a space located radially outside the coil holding portion 42 of the stator 41. To an inner peripheral portion of the rotor 46, a motor rotation shaft 49 is fixed. Although not illustrated in FIG. 12, the fan rotor 14a of the cross-flow fan 14 is fixed to a left end part of the motor rotation shaft 49. FIG. 11 is a view of the rotor 46 as viewed obliquely from upper right.

Figure 9:
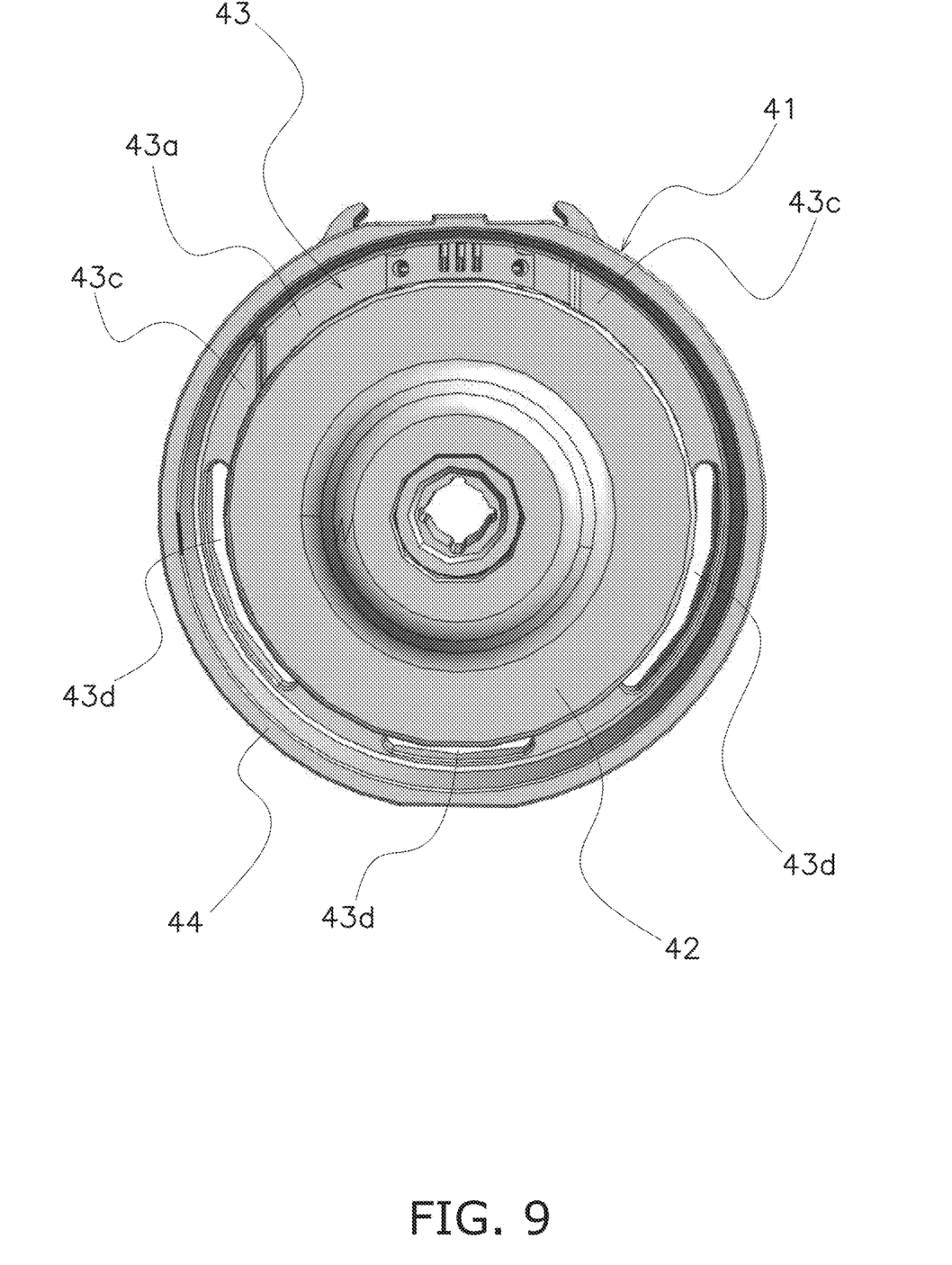
FIG. 9 is a view of a stator of the motor as viewed from a left side along a rotation axis direction.
Figure 10:
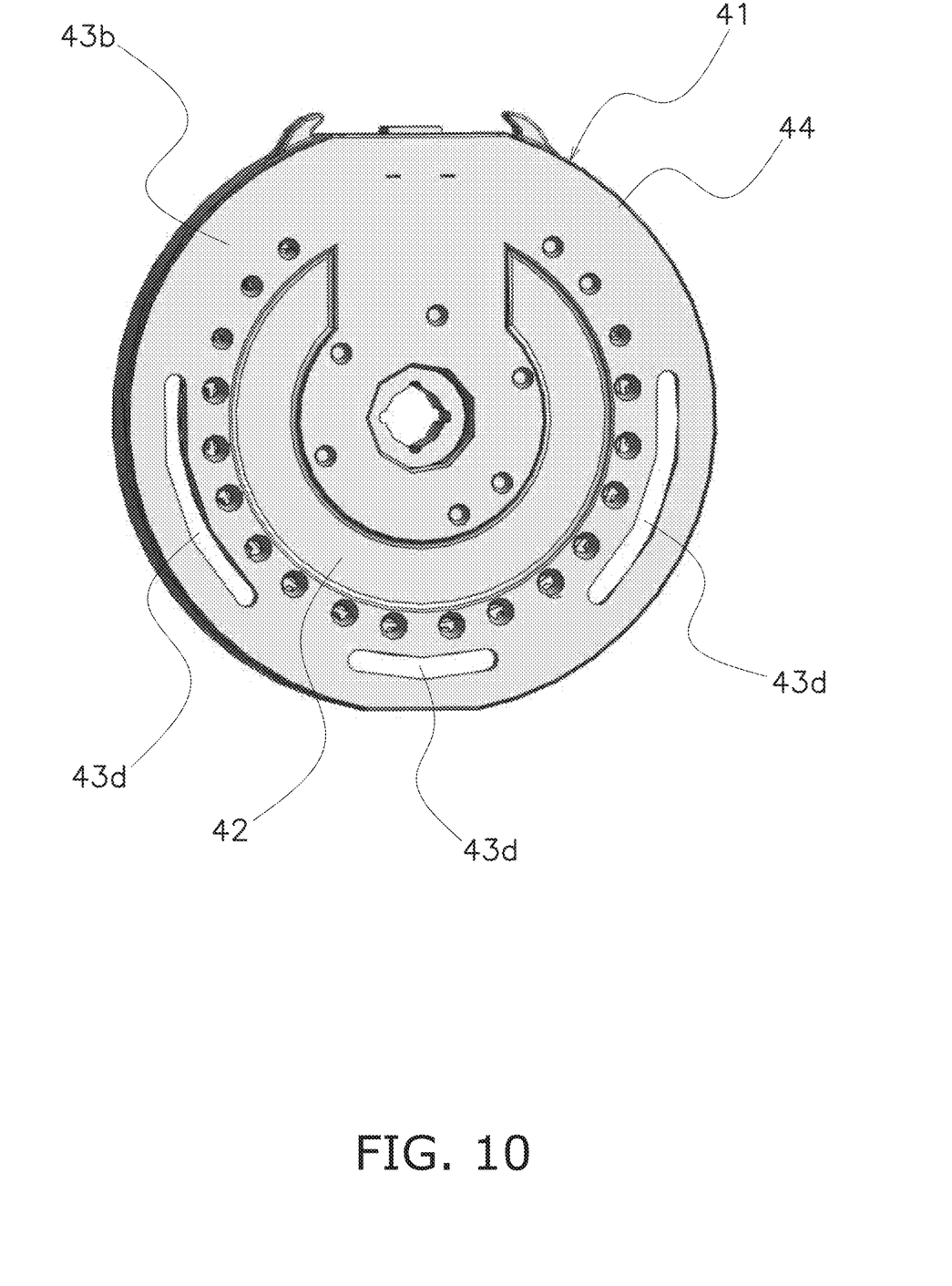
FIG. 10 is a view of the stator of the motor as viewed from a right side along the rotation axis direction.

As illustrated in FIGS. 12, 9, and 10, the first portion 43 of the stator 41 has a first surface 43a that is in contact with the first space S11 and a second surface 43b that is not in contact with the first surface 43a. The first surface 43a is a left side surface of the first portion 43, and the second surface 43b is the right side surface of the first portion 43. In the first portion 43 of the stator 41, a concave portion 43c concaved from the first surface 43a toward the second surface 43b and three through holes 43d penetrating from the first surface 43a to the second surface 43b are formed. The through hole 43d is a long hole extending in an arc-shape in a circumferential direction.

Current flowing through the coil 42a of the stator 41 generates a magnetic field, and the rotor 46 having the magnet 46b rotates. This causes a rotation of the motor rotation shaft 49, and causes a rotation of the fan rotor 14a of the cross-flow fan 14 fixed to the motor rotation shaft 49. Between an inner peripheral portion of the stator 41 and the motor rotation shaft 49, bearings 48 illustrated in FIG. 12 are disposed. Via these bearings 48, the motor rotation shaft 49 and the rotor 46 are supported by the stator 41.

(3-2) Motor Assembly

The motor assembly 30 includes the motor 40, the sealing member 60, and the frame 11 including the first motor supporting portion 23 and the second motor support member 24. The sealing member 60 is disposed on a side of the stator 41 opposite to the rotor 46 (the right side of the stator 41) in a rotation axis direction CA1. The motor 40 and the sealing member 60 are fixed to the first motor supporting portion 23 and the second motor support member 24 of the frame 11.

The sealing member 60 is fixed to the frame 11 such that a second space S12 between the sealing member 60 and the stator 41 does not communicate with a space S3 that is an external space other than the first space S11. The space S3 is a space on the right side of the motor 40 and the sealing member 60, and is partitioned from the space S2, which is an arrangement space of the cross-flow fan 14 through which air having passed through the heat exchanger 12 flows. The seal member 50 exists on the entire circumference between an outer peripheral portion of the sealing member 60 and the outer peripheral portion 44 of the stator 41, and the second space S12 and the space S3 on the right side of the sealing member 60 are partitioned so as not to be able to communicate with each other (see FIG. 5).

As illustrated in FIG. 4, the sealing member 60 is screwed to the frame 11 and fixed to the frame 11. In a state of being fixed to the frame 11, the sealing member 60 presses the motor 40 and the seal member 50 to the left side in the rotation axis direction CA1.

As illustrated in FIG. 12, the plate-shaped sealing member 60 presses the motor 40 and the seal member 50 against the first motor supporting portion 23 of the frame 11 by pressing an end surface of the seal member 50 from the right side.

Further, as illustrated in FIG. 12, an outer peripheral surface of the outer peripheral portion 44 of the motor 40 is radially separated from a rotation center line CA of the cross-flow fan 14 farther than an outer peripheral surface of the magnet holding portion 46a, which is an outer peripheral portion of the rotor 46. A part 46c of the outer peripheral portion of the rotor 46 illustrated in FIG. 12 is located closer to the cross-flow fan 14 (left side) than an edge of the outer peripheral portion 44 of the motor 40 on the cross-flow fan side (left side). In a space radially outside the part 46c of the outer peripheral portion of the rotor 46, the seal member 50 seals a gap between the motor 40 and the first motor supporting portion 23 and the second motor support member 24 of the frame 11.

(4) Features (4-1)

In the motor 40 of the air conditioning indoor unit 10, the magnet holding portion 46a of the rotor 46 is disposed in the first space S11 radially outside the coil holding portion 42 of the stator 41. Then, the concave portion 43c and the through hole 43d are formed toward the second surface 43b on the right side of the first portion 43 of the stator 41 in contact with the first space S11 from the first surface 43a on the left side of the first portion 43. The presence of the concave portion 43c and the through hole 43d causes disturbance according to a rotation of the rotor 46, in air existing in a space of a gap between the coil holding portion 42 of the stator 41 and the magnet holding portion 46a of the rotor 46 or in a space near the gap (a space on the right side of the magnet holding portion 46a). This air disturbance promotes exchange (convection) of air between the space of the gap or near the gap between the coil holding portion 42 of the stator 41 and the magnet holding portion 46a of the rotor 46 and the spaces S2 and S12 in the vicinity other than the space, and improves a heat dissipation property of the motor 40.

(4-2)

In the motor 40 of the air conditioning indoor unit 10, as the through hole 43d, an arc-shaped hole is adopted rather than a circular hole, and is formed in the first portion 43 of the stator 41. Therefore, a cross-sectional area of the through hole 43d is increased, and the heat dissipation property of the motor 40 is improved.

(4-3)

The motor 40 of the air conditioning indoor unit 10 has a plurality of (three) through holes 43d formed in the first portion 43 of the stator 41. Therefore, a total cross-sectional area of air flow paths by the through holes 43d is increased. This improves the heat dissipation property of the motor 40.

Further, the motor 40 of the air conditioning indoor unit 10 promotes heat dissipation due to recirculation with any one through hole 43d as an inlet and another through hole 43d as an outlet. Furthermore, heat convection is promoted in which air having a high temperature (low density) passes through any one through hole 43d as an ascending port and air having a low temperature (high density) passes through another through hole 43d as a suction port.

(4-4)

In the air conditioning indoor unit 10, the sealing member 60 is disposed on a side (right side) opposite to the rotor 46, among both sides (right side and left side) of the stator 41 in the rotation axis direction CAL By fixing the sealing member 60 to the frame 11, the second space S12 between the sealing member 60 and the stator 41 does not communicate with an external space (the space S3 on the right side of the sealing member 60) other than the first space S11. Therefore, communication between the space S3 and the first space S11 of the motor 40 via the second space S12 is eliminated, and a problem that an unnecessary substance such as water or dust enters the first space S11 from the space S3 is suppressed. On the other hand, since the through hole 43d can be formed in the first portion 43 of the stator 41 by using the second space S12, the heat dissipation property of the motor 40 is improved.

(5) Modifications (5-1)

In the above embodiment, an arc-shaped hole extending in the circumferential direction is adopted as the through hole 43d, but a through hole having other flow path cross-sectional shape may be adopted.

Further, in the above embodiment, two or more through holes 43d are formed in the first portion 43 of the stator 41, but only one through hole may be formed.

(5-2)

In the above embodiment, the concave portion 43c and the through hole 43d are formed in the first portion 43 of the stator 41, but only one of the concave portion 43c and the through hole 43d may be formed. In addition, a size and a number of the concave portions 43c may be changed.

(5-3)

Although the embodiments of the present disclosure have been described above, it will be understood that various changes in form and details can be made without departing from the spirit and scope of the present disclosure described in claims.

The invention claimed is:

1. A motor assembly comprising:
   a motor;
   a sealing member; and
   a frame with the motor and the sealing member fixed thereto,
   the motor including
      a stator including a coil holding portion and a first portion, the coil holding portion holding a coil, the first portion having an annular shape and extending radially outward from the coil holding portion,
      a rotor including a magnet and a magnet holding portion that holds the magnet, the rotor being disposed on a first side of the stator along a rotation axis direction,
      the magnet holding portion being located in a first space having an annular shape and located radially outside the coil holding portion,
      the first portion having
         a first surface having an annular shape and being in contact with the first space, and
         a second surface having an annular shape and being on a side opposite to the first surface,
      at least one through hole being provided in the first portion at a position radially outward of the coil, the at least one through hole penetrating from the first surface to the second surface, and
   the sealing member being
      disposed on a second side of the stator opposite from the rotor along the rotation axis direction, and
      fixed to the frame in such a way that a second space is formed between the sealing member and the stator, the second space being closed except that it communicates with the first space via the at least one through hole.

2. The motor assembly according to claim 1, wherein the at least one through hole is an arc-shaped hole extending in a circumferential direction.

3. The motor assembly according to claim 2, wherein the at least one through hole includes two or more of through holes are formed in the first portion, each of the two or more through holes being arc-shaped.

4. The motor assembly according to claim 2, wherein the stator further includes an outer peripheral portion extending in the rotation axis direction from an outer peripheral end part of the first portion.

5. An air conditioner including the motor assembly according to claim 2, the air conditioner further comprising:
   a fan having a rotational body fixed to the rotor, the fan being configured to send air into a room.

6. The motor assembly according to claim 1, wherein the at least one through hole includes two or more of through holes formed in the first portion.

7. The motor assembly according to claim 6, wherein the stator further includes an outer peripheral portion extending in the rotation axis direction from an outer peripheral end part of the first portion.

8. An air conditioner including the motor assembly according to claim 6, the air conditioner further comprising:
   a fan having a rotational body fixed to the rotor, the fan being configured to send air into a room.

9. The motor assembly according to claim 1, wherein the stator further includes an outer peripheral portion extending in the rotation axis direction from an outer peripheral end part of the first portion.

10. An air conditioner including the motor assembly according to claim 9, the air conditioner further comprising:
- a fan having a rotational body fixed to the rotor, the fan being configured to send air into a room.

11. An air conditioner including the motor assembly according to claim 1, the air conditioner further comprising:
- a fan having a rotational body fixed to the rotor, the fan being configured to send air into a room.

* * * * *